(12) United States Patent
Tsuchida et al.

(10) Patent No.: US 9,423,559 B2
(45) Date of Patent: Aug. 23, 2016

(54) MULTI-CORE AMPLIFICATION OPTICAL FIBER

(71) Applicant: Furukawa Electric Co., Ltd., Tokyo (JP)

(72) Inventors: Yukihiro Tsuchida, Tokyo (JP); Yu Mimura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 214 days.

(21) Appl. No.: 14/106,338

(22) Filed: Dec. 13, 2013

(65) Prior Publication Data

US 2015/0316714 A1  Nov. 5, 2015

Related U.S. Application Data

(63) Continuation of application No. PCT/JP2012/064171, filed on May 31, 2012.

(60) Provisional application No. 61/497,784, filed on Jun. 16, 2011.

(51) Int. Cl.
| G02B 6/02 | (2006.01) |
|---|---|
| G02B 6/036 | (2006.01) |
| G02B 6/028 | (2006.01) |
| G02B 6/032 | (2006.01) |
| H01S 3/067 | (2006.01) |

(52) U.S. Cl.
CPC .......... *G02B 6/02042* (2013.01); *G02B 6/0285* (2013.01); *G02B 6/032* (2013.01); *G02B 6/03622* (2013.01); *H01S 3/06737* (2013.01); *H01S 3/06754* (2013.01); *H01S 3/06725* (2013.01); *H01S 3/06729* (2013.01); *H01S 3/06733* (2013.01); *H01S 3/06741* (2013.01)

(58) Field of Classification Search
USPC .................................................... 385/127, 43
See application file for complete search history.

(56) References Cited

U.S. PATENT DOCUMENTS

| 5,566,196 A | 10/1996 | Scifres |
| 5,944,867 A * | 8/1999 | Chesnoy ........... C03B 37/01205 |
| | | 65/408 |

(Continued)

FOREIGN PATENT DOCUMENTS

| JP | 10-125988 A | 5/1998 |
| JP | 2003-226540 A | 8/2003 |

(Continued)

OTHER PUBLICATIONS

Extended European Search Report issued Oct. 7, 2014 in Patent Application No. 12799722.9.

(Continued)

*Primary Examiner* — Kaveh C Kianni
(74) *Attorney, Agent, or Firm* — Oblon, McClelland, Maier & Neustadt, L.L.P.

(57) ABSTRACT

A multi-core amplification optical fiber includes: a plurality of core portions doped with a rare-earth element; an inner cladding portion positioned at a periphery of the plurality of core portions, having a refractive index lower than a refractive index of the plurality of core portions, in which a first hole is formed; and an outer cladding layer positioned at a periphery of the inner cladding portion, having a refractive index lower than the refractive index of the inner cladding portion.

4 Claims, 4 Drawing Sheets

(56) References Cited

U.S. PATENT DOCUMENTS

| | | | |
|---|---|---|---|
| 6,031,850 A * | 2/2000 | Cheo | H01S 3/094003 372/6 |
| 6,301,420 B1 | 10/2001 | Greenaway et al. | |
| 7,027,699 B2 * | 4/2006 | Tao | B29D 11/00721 385/126 |
| 7,142,757 B1 * | 11/2006 | Ward | G02B 6/02338 385/125 |
| 7,580,600 B1 * | 8/2009 | Starodubov | G02B 6/4296 385/124 |
| 7,876,495 B1 * | 1/2011 | Minelly | C03B 37/0122 359/341.1 |
| 8,285,094 B2 | 10/2012 | Takenaga et al. | |
| 8,320,724 B2 * | 11/2012 | Sasaoka | G02B 6/02042 385/121 |
| 8,687,931 B2 * | 4/2014 | Sasaoka | G02B 6/02342 385/125 |
| 8,861,914 B2 * | 10/2014 | Hayashi | G02B 6/02042 385/126 |
| 2002/0176677 A1 * | 11/2002 | Kumar | C03B 37/01222 385/126 |
| 2003/0165313 A1 | 9/2003 | Broeng et al. | |
| 2004/0208464 A1 | 10/2004 | Po | |
| 2004/0264513 A1 * | 12/2004 | Shima | C03C 13/04 372/6 |
| 2005/0069269 A1 * | 3/2005 | Libori | G02B 6/02042 385/125 |
| 2005/0157998 A1 * | 7/2005 | Dong | G02B 6/02009 385/126 |
| 2006/0263024 A1 * | 11/2006 | Dong | G02B 6/02 385/125 |
| 2006/0291788 A1 | 12/2006 | Po | |
| 2007/0036500 A1 * | 2/2007 | Suzuki | B82Y 20/00 385/129 |
| 2007/0041083 A1 * | 2/2007 | Di Teodoro | G02B 6/02347 359/333 |
| 2007/0104431 A1 * | 5/2007 | Di Teodoro | G02B 6/02347 385/123 |
| 2007/0266738 A1 * | 11/2007 | Gallagher | C03B 37/01211 65/393 |
| 2009/0201575 A1 | 8/2009 | Fermann et al. | |
| 2009/0324242 A1 | 12/2009 | Imamura | |
| 2010/0067860 A1 | 3/2010 | Ikeda et al. | |
| 2011/0052129 A1 * | 3/2011 | Sasaoka | G02B 6/02042 385/126 |
| 2011/0222828 A1 * | 9/2011 | Sasaoka | G02B 6/02042 385/127 |
| 2011/0249940 A1 * | 10/2011 | Sasaoka | G02B 6/02042 385/39 |
| 2011/0274398 A1 * | 11/2011 | Fini | G02B 6/0365 385/124 |
| 2011/0280517 A1 * | 11/2011 | Fini | G02B 6/02042 385/43 |
| 2012/0134637 A1 * | 5/2012 | Imamura | G02B 6/0365 385/127 |
| 2012/0206794 A1 | 8/2012 | Fermann et al. | |
| 2013/0243384 A1 * | 9/2013 | Matsuo | G02B 6/0365 385/127 |
| 2013/0294737 A1 * | 11/2013 | Dianov | G02B 6/02042 385/127 |
| 2014/0010507 A1 * | 1/2014 | Sasaki | G02B 6/02042 385/126 |
| 2014/0036350 A1 | 2/2014 | Fermann et al. | |

FOREIGN PATENT DOCUMENTS

| | | | | |
|---|---|---|---|---|
| JP | 2003226540 A | * | 8/2003 | |
| JP | 2005-019539 A | | 1/2005 | |
| JP | 2005-500583 A | | 1/2005 | |
| WO | WO 2008/133242 A1 | | 11/2008 | |
| WO | WO 2009/107414 A1 | | 9/2009 | |
| WO | WO 2010082656 A1 | * | 7/2010 | G02B 6/02042 |
| WO | WO 2011/024808 A1 | | 3/2011 | |

OTHER PUBLICATIONS

International Search Report mailed Jul. 3, 2012 for PCT/JP2012/064171 filed on May 31, 2012 with English Translation.

International Written Opinion mailed Jul. 3, 2012 for PCT/JP2012/064171 filed on May 31, 2012.

Notice of Rejection mailed Feb. 26, 2013 issued on the corresponding JP Application No. 2013-500281 with English Translation.

U.S. Appl. No. 14/245,672, filed Apr. 4, 2014, Tsuchida, et al.

* cited by examiner

US 9,423,559 B2

MULTI-CORE AMPLIFICATION OPTICAL FIBER

CROSS-REFERENCE TO RELATED APPLICATION(S)

This application is a continuation of PCT International Application No. PCT/JP2012/064171 filed on May 31, 2012 which claims the benefit of priority from U.S. Provisional Patent Application No. 61/497,784 filed on Jun. 16, 2011, the entire contents of which are incorporated herein by reference.

BACKGROUND OF THE INVENTION

1. Field of the Invention

The present invention relates to a multi-core amplification optical fiber.

2. Description of the Related Art

In order to cope with a rapid increase in a data transmission volume in recent years, a multi-core optical transmission line that uses a so-called multi-core optical fiber in which a plurality of core portions is arranged in the cladding of one optical fiber has been actively developed. Accordingly, development of a rare-earth-doped optical fiber amplifier for amplifying signal lights having propagated through the multi-core optical transmission line is requested.

For example, Japanese Laid-open Patent Publication No. 2005-19539 discloses a multi-core amplification optical fiber for an optical fiber laser, in which a plurality of rare-earth-doped core portions is disposed in the cladding. Moreover, Japanese Laid-open Patent Publication No. 10-125988 discloses a multi-core optical fiber amplifier for amplifying signal lights in a lump, the signal lights having propagated through a multi-core optical transmission line.

Meanwhile, some conventional rare-earth-doped amplification optical fibers in which one core portion is disposed near a central axis of an optical fiber employ a double-cladding structure. In the double-cladding structure, it is known that, when an inner cladding has a circular cross-sectional shape, a certain component (skew component) of a pumping light may not reach the core portion and does not contribute to pumping, and thus, pumping efficiency is not satisfactory. Therefore, a method of forming an inner cladding so as to have a star-shaped, polygonal, or D-shaped cross-section is used in order to disturb the skew component so as to be efficiently absorbed in the core portion (see Japanese Laid-open Patent Publication No. 2003-226540).

SUMMARY OF THE INVENTION

It is an object of the present invention to at least partially solve the problems in the conventional technology.

In accordance with one aspect of the present invention, a multi-core amplification optical fiber includes: a plurality of core portions doped with a rare-earth element; an inner cladding portion positioned at a periphery of the plurality of core portions, having a refractive index lower than a refractive index of the plurality of core portions, in which a first hole is formed; and an outer cladding layer positioned at a periphery of the inner cladding portion, having a refractive index lower than the refractive index of the inner cladding portion.

In accordance with another aspect of the present invention, a multi-core amplification optical fiber includes: a plurality of core portions doped with a rare-earth element; and a cladding portion positioned at a periphery of the plurality of core portions, having a refractive index lower than a refractive index of the plurality of core portions, in which a first hole and a plurality of second holes disposed so as to surround the plurality of core portions and the first hole are formed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a multi-core amplification optical fiber according to the present invention will be explained in detail with reference to the drawings. However, the present invention is not limited to these embodiments. Moreover, terms that are not particularly defined in the present specification are subject to the definitions and test methods in International Telecommunication Union (ITU-T) G.650.1.

In the multi-core amplification optical fiber, since the amounts of light used for pumping the plurality of core portions are not even due to the influence of the skew component or the like, there is a problem that the optical amplification characteristics of the respective core portions are not even.

In contrast, according to the embodiment described below, it is possible to provide an advantage that a multi-core amplification optical fiber in which fluctuation of the optical amplification characteristics of the respective core portions is suppressed.

Figure 1:
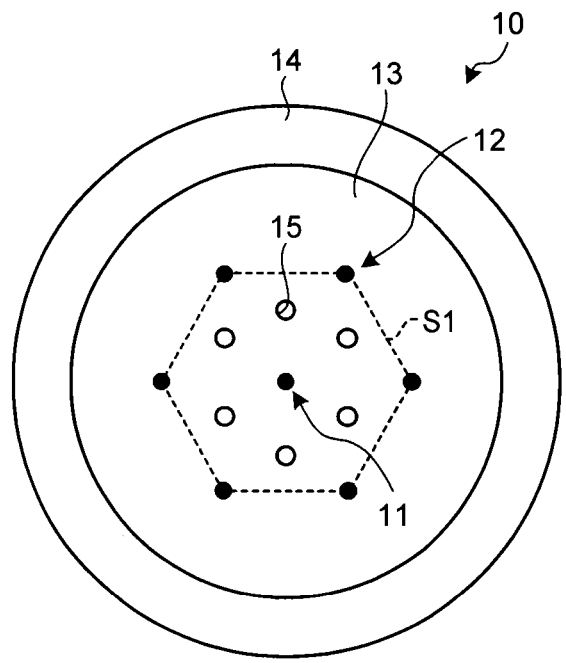
FIG. 1 is a schematic cross-sectional diagram of a multi-core amplification optical fiber according to a first embodiment.

FIG. 1 is a schematic cross-sectional diagram of a multi-core amplification optical fiber according to a first embodiment. As illustrated in FIG. 1, a multi-core amplification optical fiber 10 includes a core portion 11 positioned near a central axis of the fiber, six core portions 12 arranged around the core portion 11, an inner cladding portion 13 positioned at the periphery of the core portions 11 and 12, and an outer cladding layer 14 positioned at the periphery of the inner cladding portion 13. A plurality of holes 15, which are first holes, is formed in the inner cladding portion 13.

The inner cladding portion 13 has a refractive index lower than the refractive index of the core portions 11 and 12. The outer cladding layer 14 has a refractive index lower than the refractive index of the inner cladding portion 13. The core portions 11 and 12 are formed from silica-based glass doped with impurities that increase a refractive index, such as germanium (Ge). The inner cladding portion 13 is formed from pure silica glass that is not doped with refractive index-adjustment impurities, for example. The outer cladding layer 14 is formed from optical resin, for example. The refractive index of the optical resin is between 1.1 and 1.42, for example.

The seven core portions 11 and 12 are doped with a rare-earth element. Examples of the rare-earth element doped include erbium (Er), ytterbium (Yb), neodymium (Nd), and thulium (Tm). The amount of the rare-earth element doped is between 50 ppm and 2000 ppm for Er, for example. Moreover, the core portions 11 and 12 have a core diameter of 1 μm to 5 μm, and a relative refractive-index difference of 0.5% to 2.0% with respect to the inner cladding portion 13. The core diameters or the relative refractive-index differences of the core portions 11 and 12 may be the same and may be different from each other.

The six core portions 12 are arranged so as to form an approximately regular hexagon around the core portion 11. The core portions 11 and 12 are disposed on lattice points of a triangular lattice. The distance between the adjacent cores of the core portions 11 and 12 is set to such a core-to-core distance that crosstalk of light between cores does not have an adverse effect on the optical characteristics of the core portions 11 and 12 and that an extinction ratio, for example, is −30 dB or smaller. When the core portions 11 and 12 have a core diameter of 1 μm to 5 μm and a relative refractive-index difference of 0.5% to 2.0% to the inner cladding portion 13 as described above, the core-to-core distance is preferably 30 μm or more. Moreover, the core-to-core distance is preferably 60 μm or smaller because an outer diameter of the fiber does not increase too much and the outer diameter of the inner cladding portion 13 can be between approximately 125 μm and 250 μm.

The six holes 15 have a circular cross-sectional shape, and for example, a hole diameter is between 1 μm and 15 μm. The holes 15 are disposed so as to form a regular hexagon within a region S1 that is surrounded by the core portions 12. The hole diameters of the holes 15 may be the same and may be different from each other.

This multi-core amplification optical fiber 10 has a double-cladding structure. When a pumping light of a wavelength in an pumping band (for example, 0.98 μm band or 1.48 μm band for Er) of the rare-earth element is input to the inner cladding portion 13 while allowing signal lights of wavelengths in an amplification band (for example, 1.5 μm band for Er) of the rare-earth element to propagate through the core portions 11 and 12, the pumping light pumps the rare-earth element doped into the core portions 11 and 12 while propagating in a state of being confined in the inner cladding portion 13. As a result, the rare-earth element exhibits a light amplification effect and amplifies the lights propagating through the core portions 11 and 12.

Figure 2:
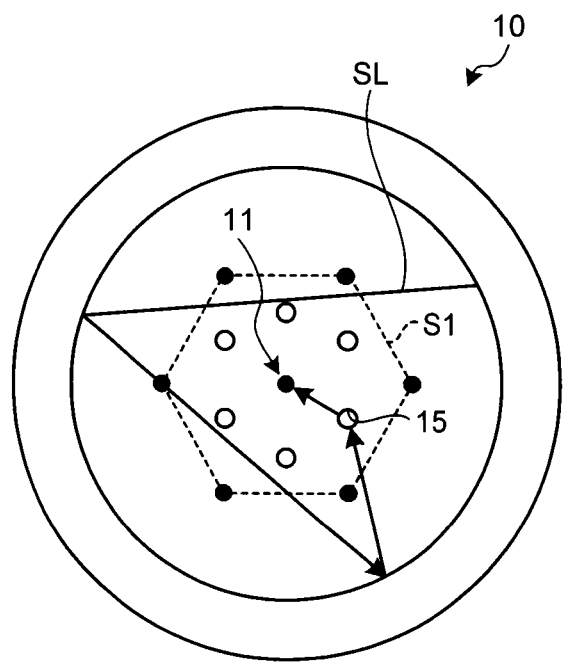
FIG. 2 is a diagram illustrating an aspect of a skew component of a pumping light in the multi-core amplification optical fiber illustrated in FIG. 1.

FIG. 2 is a diagram illustrating an aspect of a skew component of a pumping light in the multi-core amplification optical fiber illustrated in FIG. 1. In the multi-core amplification optical fiber 10, a skew component SL included in the pumping light propagating through the inner cladding portion 13 propagates along an optical path that does not reach the core portion 11 at the center when the holes 15 are not present. However, the skew component SL reaches the core portion 11 at the center because the optical path is disturbed by the holes 15.

In this manner, in the multi-core amplification optical fiber 10, since the optical path of the skew component is disturbed due to the presence of the respective holes 15, the fluctuation of the amount of pumping light used for pumping the respective core portions 11 and 12 is suppressed as compared to a case when the respective holes 15 are not present. Accordingly, in the multi-core amplification optical fiber 10, the fluctuation of the optical amplification characteristics of the respective core portions 11 and 12 is suppressed. As a result, the optical amplification characteristics of the respective core portions 11 and 12 become more uniform.

Moreover, since the holes 15 are disposed in the region S1 surrounded by the core portion 12, the skew component of which the optical path is disturbed is likely to reach the core portion 11 which is positioned in the same region S1 and of which the pumping efficiency is likely to decrease. Accordingly, it is possible to disturb the skew component so that the fluctuation of the amount of pumping light used for pumping the respective core portions 11 and 12 is suppressed more effectively.

Figure 3:
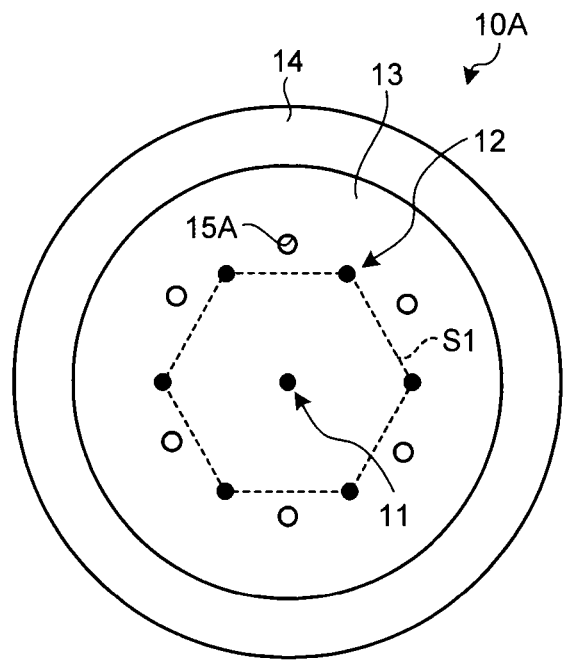
FIG. 3 is a schematic cross-sectional diagram of a multi-core amplification optical fiber according to a modification of the first embodiment.

FIG. 3 is a schematic cross-sectional diagram of a multi-core amplification optical fiber according to a modification of the first embodiment. As illustrated in FIG. 3, a multi-core amplification optical fiber 10A is different from the multi-core amplification optical fiber 10 according to the first embodiment in that instead of the holes 15, holes 15A having the same diameter as the holes 15 are disposed in the inner cladding portion 13 so as to form a regular hexagon.

As in the multi-core amplification optical fiber 10A, the holes 15A may be disposed outside the region S1 surrounded by the core portions 12.

Figure 4:
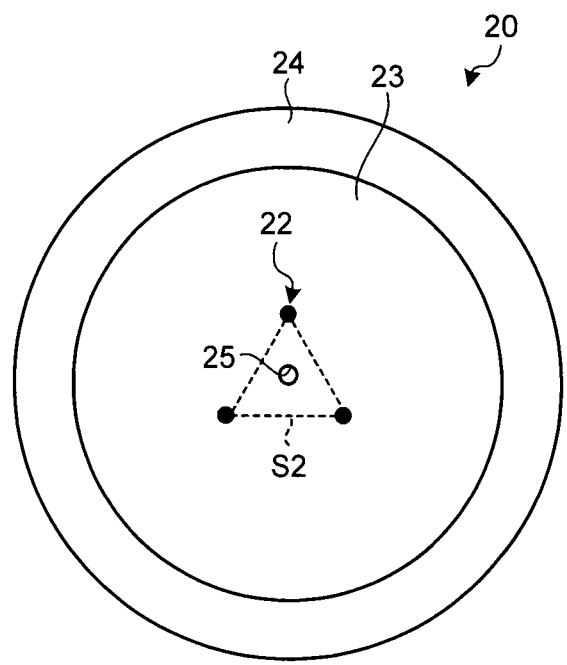
FIG. 4 is a schematic cross-sectional diagram of a multi-core amplification optical fiber according to a second embodiment.

FIG. 4 is a schematic cross-sectional diagram of a multi-core amplification optical fiber according to a second embodiment. As illustrated in FIG. 4, a multi-core amplification optical fiber 20 includes three core portions 22, an inner cladding portion 23 positioned at the periphery of the core portions 22, and an outer cladding layer 24 positioned at the periphery of the inner cladding portion 23. A hole 25, which is a first hole, is formed in the inner cladding portion 23.

The three core portions 22 are disposed on lattice points of a triangular lattice so as to form an approximately regular triangle. The hole 25 is disposed approximately at the center of a region S2 that is surrounded by the core portions 22.

The characteristics (for example, a constituent material, a size, a core-to-core distance, a relation of refractive indices, and the like) of the core portions 22, the inner cladding portion 23, the outer cladding layer 24, and the hole 25 is the same as those of the corresponding elements of the first embodiment.

In this multi-core amplification optical fiber 20, similarly to the multi-core amplification optical fiber 10, since an optical path of a skew component is disturbed due to the presence of the hole 25, the fluctuation of the amount of pumping light used for pumping the respective core portions is suppressed as compared to a case when the hole 25 is not present. As a result, the optical amplification characteristics of the respective core portions 22 become more uniform.

Figure 5:
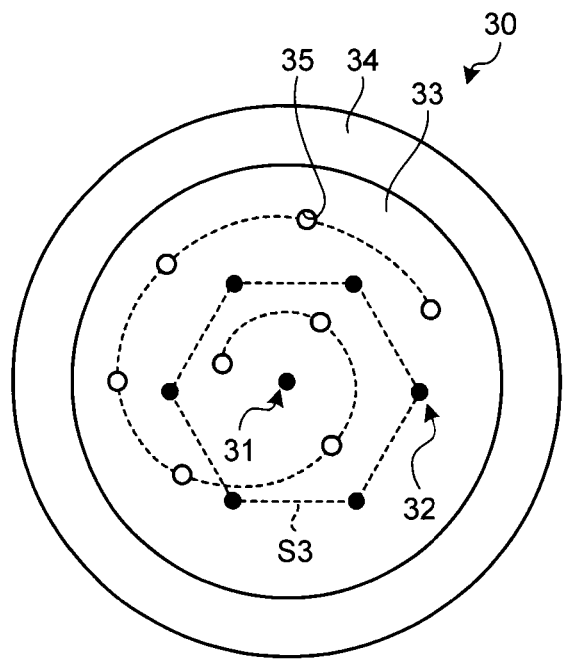
FIG. 5 is a schematic cross-sectional diagram of a multi-core amplification optical fiber according to a third embodiment.

FIG. 5 is a schematic cross-sectional diagram of a multi-core amplification optical fiber according to a third embodiment. As illustrated in FIG. 5, a multi-core amplification optical fiber 30 includes seven core portions 31 and 32, an inner cladding portion 33 positioned at the periphery of the core portions 31 and 32, and an outer cladding layer 34 positioned at the periphery of the inner cladding portion 33. Holes 35, which are first holes, are formed in the inner cladding portion 33.

The six core portions 32 are disposed so as to form an approximately regular hexagon around the core portion 31. The core portions 31 and 32 are disposed on lattice points of a triangular lattice.

The characteristics (for example, a constituent material, a size, a core-to-core distance, a relation of refractive indices, and the like) of the core portions 31 and 32, the inner cladding portion 33, the outer cladding layer 34, and the holes 35 are the same as those of the corresponding elements of the first embodiment.

In this multi-core amplification optical fiber 30, the holes 35 are disposed in a spiral form that extends outward from the inner side of a region S3 surrounded by the core portions 32. In this manner, in terms of the arrangement of the holes, it is not limited to a regular hexagonal shape but the holes may be arranged in various regular or irregular shapes. Moreover, the number of holes is not particularly limited, and one or plural holes may be formed. Preferably, the arrangement shape and the number of holes are appropriately set so that the skew component is disturbed in such a manner that the fluctuation of the optical amplification characteristics of the respective core portions is suppressed.

Figure 6:
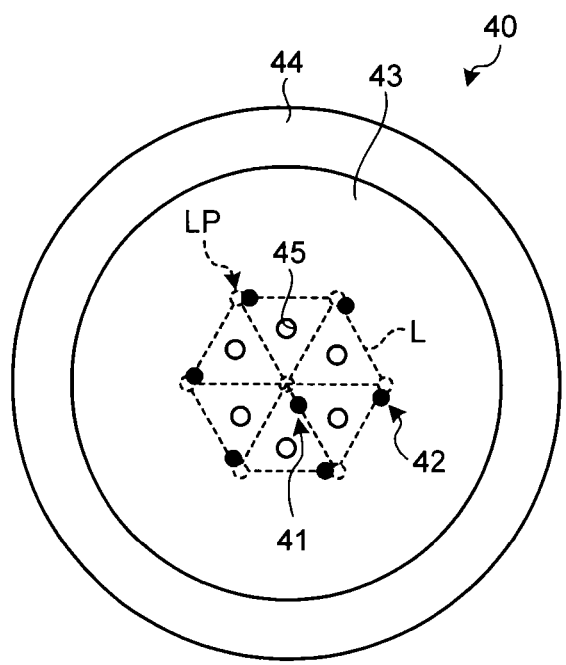
FIG. 6 is a schematic cross-sectional diagram of a multi-core amplification optical fiber according to a fourth embodiment.

FIG. 6 is a schematic cross-sectional diagram of a multi-core amplification optical fiber according to a fourth embodiment. As illustrated in FIG. 6, a multi-core amplification optical fiber 40 includes seven core portions 41 and 42, an inner cladding portion 43 positioned at the periphery of the core portions 41 and 42, and an outer cladding layer 44 positioned at the periphery of the inner cladding portion 43. Holes 45, which are first holes, are formed in the inner cladding portion 43.

The characteristics (for example, a constituent material, a size, a core-to-core distance, a relation of refractive indices, and the like) of the core portions 41 and 42, the inner cladding portion 43, the outer cladding layer 44, and the holes 45 are the same as those of the corresponding elements of the first embodiment.

Here, the seven core portions 41 and 42 are disposed at positions shifted from lattice points LP of a triangular lattice L. Moreover, the six holes 45 are disposed so as to form a regular hexagon in a region surrounded by the core portions 42.

In this manner, the core portions may not necessarily be disposed on the lattice points of the triangular lattice but may be shifted from the lattice points. Since the core portions are arranged in such a low symmetrical arrangement, it is possible to suppress the fluctuation of the optical amplification characteristics of the respective core portions by the synergistic effect with the effect of disturbing the skew component by the holes.

When the core portions are shifted from the triangular lattice points, for example, the seven core portions may be disposed so that the core-to-core distance of at least one set of adjacent core portions is different from the core-to-core distance of the other core portions. In this case, a difference in the core-to-core distance is preferably 0.5 μm to 10 μm.

As a method of manufacturing a multi-core amplification optical fiber in which the positions of the core portions are shifted from the triangular lattice points, for example, a method of using the play of a glass rod or a glass tube stacked in a well-known stack-and-draw method, a method of using glass rods or glass tubes having different outer diameters, and other methods are known.

Figure 7:
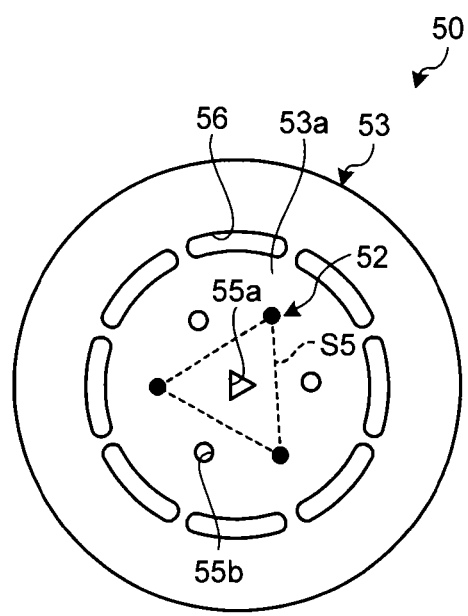
FIG. 7 is a schematic cross-sectional diagram of a multi-core amplification optical fiber according to a fifth embodiment.

FIG. 7 is a schematic cross-sectional diagram of a multi-core amplification optical fiber according to a fifth embodiment. As illustrated in FIG. 7, a multi-core amplification optical fiber 50 includes core portions 52 and a cladding portion 53 positioned at the periphery of the core portions 52.

Holes 55a and 55b, which are first holes, are formed in the cladding portion 53. Further, a plurality of holes 56, which are second holes, is formed in the cladding portion 53 so as to surround the core portions 52 and the holes 55a and 55b. The holes 56 are elliptical and are bent in an arc shape.

In the multi-core amplification optical fiber 50, due to the plurality of holes 56 functioning as an air cladding, a pumping light propagates in a state of being confined in an inner region 53a of the cladding portion 53 surrounded by the holes 56.

The three core portions 52 are disposed on lattice points of a triangular lattice so as to form an approximately regular triangle. The hole 55a has a triangular cross-sectional shape and is disposed approximately at the center of a region S5 surrounded by the core portions 52. The holes 55b have a circular cross-sectional shape and are disposed so as to form an approximately regular triangle outside the region S5. In this manner, the first hole is not limited to a hole having a circular cross-sectional shape but may have an elliptical shape or a polygonal cross-sectional shape such as a triangular shape.

The characteristics (for example, a constituent material, a size, a core-to-core distance, a relation of refractive indices, and the like) of the core portions 52 and the cladding portion 53 are the same as those of the corresponding elements of the first embodiment. The cross-sectional areas of the holes 55a and 55b are approximately the same as a cross-sectional area of a hole that has a circular cross-sectional shape and has a hole diameter of 1 μm to 15 μm and.

In the multi-core amplification optical fiber 50, since an optical path of a skew component of a pumping light generated in the inner region 53a is disturbed by the holes 55a and 55b, the optical amplification characteristics of the respective core portions 52 become more uniform.

The present invention is not limited to the embodiments described above. The present invention also includes one in which the respective constituent components described above are appropriately combined. For example, the core portions in the fifth embodiment illustrated in FIG. 7 may be shifted from the triangular lattice points. Moreover, new advantages and modifications can easily occur to those skilled in the art. Thus, broader aspects of the present invention are not limited to the embodiments and various changes can be made.

As described above, the multi-core amplification optical fiber according to the present invention is suitable for use in optical communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multi-core amplification optical fiber comprising:
 a plurality of core portions doped with a rare-earth element; and
 a cladding portion positioned at a periphery of the plurality of core portions, the cladding portion having a refractive index lower than a refractive index of the plurality of core portions, wherein
 a distance between adjacent core portions included in the plurality of core portions is set to such a core-to-core distance that crosstalk of light between cores does not have an effect on the optical characteristics of the adjacent core portions to each other, the number of the core portions included in the plurality of core portions is three or more, and a difference between the core-to-core distances of the at least one set of the adjacent core portions and the core-to-core distances of the other core portions is 0.5 μm to 10 μm.

2. The multi-core amplification optical fiber according to claim 1, wherein a hole is disposed in a region surrounded by the plurality of core portions in a cross-section of the multi-core amplification optical fiber.

3. The multi-core amplification optical fiber according to claim 1, wherein a first hole is formed in the cladding portion, the first hole being disposed in a region surrounded by the plurality of core portions in the cross-section of the multi-core amplification optical fiber.

4. The multi-core amplification optical fiber according to claim 1, wherein the cladding portion comprises:

an inner cladding portion; and an outer cladding portion positioned at a periphery of the inner cladding portion, the outer cladding portion having a refractive index lower than a refractive index of the inner cladding portion.

* * * * *